(12) United States Patent
Yamaguchi et al.

(10) Patent No.: US 9,891,434 B2
(45) Date of Patent: Feb. 13, 2018

(54) IMAGE DISPLAY SYSTEM

(71) Applicant: Panasonic Intellectual Property Management Co., Ltd., Osaka (JP)

(72) Inventors: Hiroshi Yamaguchi, Osaka (JP); Kazuhiro Yamada, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 15/356,805

(22) Filed: Nov. 21, 2016

(65) Prior Publication Data

US 2017/0269360 A1   Sep. 21, 2017

(30) Foreign Application Priority Data

Mar. 16, 2016 (JP) .................. 2016-051765
Nov. 8, 2016 (JP) .................. 2016-217736

(51) Int. Cl.
| G03B 21/10 | (2006.01) |
| G03B 21/604 | (2014.01) |
| G03B 21/60 | (2014.01) |
| H04N 9/31 | (2006.01) |
| G02B 27/01 | (2006.01) |
| G03B 21/62 | (2014.01) |
| G02B 27/28 | (2006.01) |
| G02B 5/30 | (2006.01) |
| G02B 5/02 | (2006.01) |
| G02B 27/22 | (2006.01) |

(52) U.S. Cl.
CPC ....... *G02B 27/0101* (2013.01); *G02B 5/0294* (2013.01); *G02B 5/3083* (2013.01); *G02B 27/2292* (2013.01); *G02B 27/286* (2013.01); *G03B 21/62* (2013.01); *G02B 2027/012* (2013.01); *G03B 21/10* (2013.01); *G03B 21/60* (2013.01); *G03B 21/604* (2013.01); *H04N 9/3141* (2013.01)

(58) Field of Classification Search
CPC ...... G03B 21/10; G03B 21/147; G03B 21/60; G03B 21/604; G03B 21/606; H04N 9/3141; H04N 9/3167
USPC .......................................... 359/460, 452, 43
See application file for complete search history.

(56) References Cited

U.S. PATENT DOCUMENTS

| 2003/0214632 A1 | 11/2003 | Ma et al. |
| 2006/0181769 A1 | 8/2006 | Kumasawa et al. |
| 2006/0232749 A1 | 10/2006 | Quach |
| 2015/0362728 A1 | 12/2015 | Tei |

(Continued)

FOREIGN PATENT DOCUMENTS

| JP | 2001-255586 | 9/2001 |
| JP | 2006-119489 | 5/2006 |

(Continued)

Primary Examiner — William C Dowling
Assistant Examiner — Ryan Howard
(74) Attorney, Agent, or Firm — Wenderoth, Lind & Ponack, L.L.P.

(57) ABSTRACT

An image display system includes a projector, a transparent screen, and a polarization adjuster. The projector projects image light. The transparent screen diffuses the image light that has been projected, to display an image. The polarization adjuster adjusts the image light that is to enter the transparent screen so that the image light is p-polarized.

7 Claims, 4 Drawing Sheets

(56) References Cited

U.S. PATENT DOCUMENTS

2016/0139497 A1* 5/2016 Usukura .............. G03B 21/602
                                                    353/20
2016/0274450 A1* 9/2016 Usukura .................. G02B 5/26

FOREIGN PATENT DOCUMENTS

| JP | 2006-163165 | 6/2006 |
| JP | 5214577 B | 6/2013 |
| JP | 2014-071250 | 4/2014 |
| JP | 2015-55856 | 3/2015 |
| JP | 2017-1649 | 1/2017 |
| WO | 2014/112412 | 7/2014 |
| WO | 2014/188978 | 11/2014 |

* cited by examiner

IMAGE DISPLAY SYSTEM

BACKGROUND

1. Technical Field

The present disclosure relates to an image display system including a transparent screen.

2. Description of the Related Art

Recent years have seen some proposals for a transparent screen that displays an image by diffusely reflecting or diffusely transmitting image light projected by a projector while transmitting background light. For example, an image display system including such a transparent screen uses a window of a high-rise building as the transparent screen on which the projected image is superimposed on a night view and displayed, or presents an image as if it were displayed in the air at a live performance or the like. As noted above, the transparent screen is expected to serve as a key device for realizing a new image expression using the projector.

One proposed transparent screen of a transmission type adopts a system of allowing image observation by dispersing a trace amount of specific diffusing particulates in a transparent body to greatly diffuse part of image light as well as allowing background observation by transmitting background light rectilinearly (see Japanese Patent No. 5214577).

Furthermore, since the diffusely transmitted light is partially reflected by an interface between a back surface of the transparent screen and the air, the structure obtained by dispersing a trace amount of the diffusing particulates in the transparent body can also be used as a transparent screen of a reflection type.

Moreover, as a transparent screen of a reflection type, proposed is a screen that is obtained by forming on a plurality of protrusions a selective reflection layer that selectively reflects right circularly polarized laser light or left circularly polarized laser light at a specific wavelength, and coating a surface of the selective reflection layer with a transparent material (see Japanese Unexamined Patent Application Publication No. 2014-71250). Additionally, another proposed transparent screen of a reflection type is a screen obtained by providing a light reflecting region in a portion of a transparent base so as to partially reflect light (see Japanese Unexamined Patent Application Publication No. 2006-119489).

With the use of the transmission-type or reflection-type transparent screen described above, an observer can both observe a background and enjoy an image.

SUMMARY

The present disclosure provides an image display system that uses a smooth-surfaced transparent screen to display an image and transmit background light as well as suppresses an unwanted image due to specular reflection of the transparent screen.

An image display system disclosed herein includes a projector, a transparent screen, and a polarization adjuster. The projector projects image light. The transparent screen diffuses the image light that has been projected, to display an image. The polarization adjuster adjusts the image light that is to enter the transparent screen so that the image light is p-polarized.

The image display system disclosed herein uses a smooth-surfaced transparent screen to display an image and transmit background light as well as suppresses an unwanted image due to specular reflection of the transparent screen.

Figure 1:
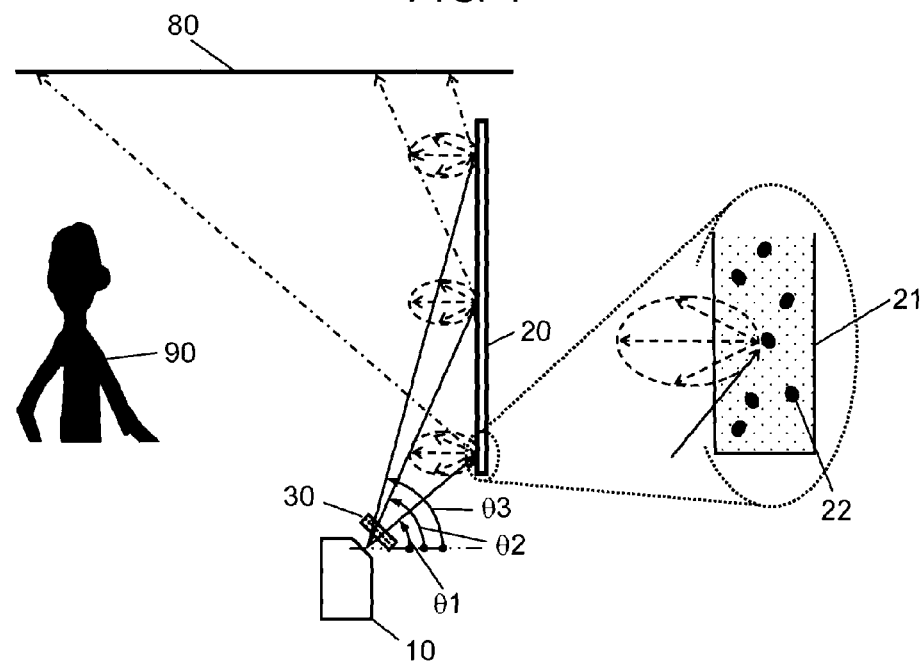
FIG. 1 is a schematic view illustrating an image display system according to Embodiment 1.

DETAILED DESCRIPTION (Circumstances Leading Up to the Present Disclosure)

In order to allow the background to be observed using a conventionally known transparent screen, at least part of light entering the transparent screen has to be transmitted rectilinearly. Since most applications place a high priority to transparency, 50% to 80% of the incident light is transmitted rectilinearly. When the transparent screen surface, which is an interface between the transparent screen and the air, has unevenness, light tends to be diffused and cannot easily be transmitted rectilinearly. Thus, in order to rectilinearly transmit light, the surface of the transparent screen needs to be smooth.

Accordingly, when the surface of the transparent screen has any element that diffusely transmits or diffusely reflects light, at least 50% of the transparent screen surface has to be smooth. When an inside of the transparent screen has any element that diffuses light, it is generally desired that an entire surface of the transparent screen should be smooth.

The light that has entered the smooth surface is specularly reflected by the surface. Image light from the projector has a locally high directivity, and light that has been specularly reflected by a surface has a high brightness. Accordingly, when the observer who observes the image directly views the specularly reflected light, the light dazzles the observer and makes it difficult to observe the image. Thus, in order to prevent the specularly reflected light from traveling toward an expected observation area, the image may be projected at wide angles downwardly from the ceiling or upwardly from the vicinity of observer's feet. However, an unwanted image due to the specular reflection is generated at the observer's feet near the transparent screen in the case of projecting the image downwardly from the ceiling and at the ceiling near the transparent screen in the case of projecting the image upwardly from the vicinity of the feet. This unwanted image generated at the ceiling or in the vicinity of the feet is found obtrusive by the observer. Furthermore, once the observer becomes aware of the unwanted image, the observer's attention is directed to the fact that the image displayed on the transparent screen is, in fact, projected by the projector.

Accordingly, the present disclosure provides an image display system that uses a smooth-surfaced transparent screen to display an image and transmit background light as well as suppresses an unwanted image due to specular reflection of the transparent screen. This enhances an effect of the transparent screen in which an image is presented as if it were displayed in the air.

The following is a detailed description of embodiments, with reference to the accompanying drawings. It should be noted however that an overly detailed description may be omitted in some cases. For example, a detailed description of a well-known matter or a redundant description of substantially the same structural components will be sometimes omitted. This is to avoid unneeded redundancy in the following description and facilitate understanding of a person having an ordinary skill in the art.

Incidentally, the attached drawings and the following description are provided in order for a person having an ordinary skill in the art to fully understand the present disclosure and not intended to limit the subject matter recited in the claims.

Embodiment 1

FIG. 1 is a schematic view illustrating an image display system according to Embodiment 1.

The image display system according to Embodiment 1 includes projector 10, reflection-type transparent screen 20, and polarizing plate 30 serving as a polarization adjuster. Projector 10 projects image light. Transparent screen 20 diffusely reflects the projected image light to display an image. Polarizing plate 30 adjusts the image light that is to enter transparent screen 20 so that the image light is p-polarized.

The image light projected by projector 10 onto transparent screen 20 is adjusted by polarizing plate 30 so as to be p-polarized before entering transparent screen 20. The image light that has been adjusted so as to be p-polarized enters transparent screen 20 and is diffusely reflected by diffusing particulates 22 inside transparent screen 20. Observer 90 who observes an image can observe, as an image, diffusely reflected light (indicated by dashed arrows in the figure) reflected by transparent screen 20. Furthermore, background light is transmitted through transparent screen 20 at a place where no image light is projected. Thus, observer 90 can also observe background and the image at the same time.

First, each of the structural components will be described.

Projector 10 is, for example, an ultra short throw projector disposed forward of and near a lower end of transparent screen 20. Projector 10 operates in Digital Light Processing (DLP) (registered trademark) system, for example, and projects unpolarized image light. If observer 90 directly observes light specularly reflected by the surface of transparent screen 20, observer 90 feels dazzled. The specularly reflected light hampers the image observation and background observation by observer 90. Accordingly, it is desired that an ultra short throw projector should be used as projector 10 to project image light onto transparent screen 20 at wide angles. Furthermore, the use of the ultra short throw projector makes it possible to utilize an open space near transparent screen 20. It should be noted that the operation system of projector 10 may be a liquid crystal system as described later or other operation systems. When projector 10 operates in the liquid crystal system, projector 10 projects polarized image light.

The incident angle of the image light entering transparent screen 20 is set as follows. That is, incident angle θ1 at the lower end of transparent screen 20 is set to 27°, incident angle θ2 in a central portion of transparent screen 20 is set to 52°, and incident angle θ3 at an upper end of transparent screen 20 is set to 64°. Here, the incident angle is an angle between a direction along which the image light enters transparent screen 20 and a direction normal to the surface of transparent screen 20.

Transparent screen 20 is obtained by adding diffusing particulates 22 into transparent base 21 whose front and back surfaces are both smooth. Transparent screen 20 diffusely reflects about 10% of the incident light by diffusing particulates 22 and transmits the remaining about 90% of the incident light. Since diffusing particulates 22 are uniformly dispersed in base 21, the image light is diffusely reflected by transparent screen 20 and becomes observable as an image.

Furthermore, since both the front and back surfaces of transparent screen 20 are smooth, light transmitted by transparent screen 20 travels rectilinearly without being scattered in a thickness direction of transparent screen 20. Consequently, observer 90 can observe the background clearly.

Polarizing plate 30 is disposed between projector 10 and transparent screen 20, on an optical axis of projector 10. Polarizing plate 30 transmits light that is polarized in a specific direction and absorbs light that is polarized in a direction perpendicular thereto. Polarizing plate 30 is disposed such that a polarization direction of the polarized light transmitted by polarizing plate 30 matches with a polarization direction of p-polarized light reaching a central portion of transparent screen 20. In other words, polarizing plate 30 transmits a p-polarized component of the image light and absorbs an s-polarized component perpendicular thereto, thereby adjusting the image light that is to enter the central portion of transparent screen 20 so that the image light is p-polarized. Here, adjusting the image light that is to enter transparent screen 20 so that the image light is p-polarized means adjusting the image light so that the p-polarized component becomes dominant in the image light that is to enter the central portion of transparent screen 20. Incidentally, polarizing plate 30 may be disposed inside projector 10 or outside projector 10 as illustrated in FIG. 1.

With the above-described configuration of the image display system, the brightness of the image light transmitted by polarizing plate 30 is reduced approximately in half due to the absorption of the s-polarized component, and the image light reaching transparent screen 20 has a p-polarized component alone.

However, for example, when polarizing plate 30 and transparent screen 20 are close to each other, the s-polarized component sometimes becomes dominant in the image light reaching a lower end portion and right and left end portions, which are distant from the central portion, of transparent screen 20. This is because the image light incident direction in the central portion of transparent screen 20 is different from that in the lower end portion and the right and left end portions of transparent screen 20. As described later, even if the s-polarized component becomes dominant in the image light reaching the lower end portion and the right and left end portions of transparent screen 20, an unwanted image due to surface reflection of transparent screen 20 is not generated easily.

Now, the description will be directed to the unwanted image generated due to the surface reflection by transparent screen 20.

As illustrated in FIG. 1, the image light projected by projector 10 (indicated by solid arrows) is specularly reflected by the surface of transparent screen 20. The specularly reflected light (indicated by alternate long and short dashed lines) is reflected at a reflection angle corresponding to the incident angle and travels toward ceiling 80 above transparent screen 20. The light specularly reflected at positions from the central portion to a lower side of transparent screen 20 has a small reflection angle (corresponding to incident angles θ1 to θ2) and travels a long distance to ceiling 80. Thus, the light specularly reflected at the positions from the central portion to the lower side of transparent screen 20 is diffused so that sharpness and brightness of the image decrease. Consequently, the unwanted image is not generated easily on ceiling 80. Moreover, the light specularly reflected in each of the right and left end portions of transparent screen 20 also travels a long distance to ceiling 80. Accordingly, the sharpness and brightness of the image decrease, so that the unwanted image is not generated easily on ceiling 80

However, the light specularly reflected at the positions from the central portion to an upper side of transparent screen 20 travels a short distance to ceiling 80. Furthermore, since projector 10 has a relatively large depth of focus, the specularly reflected light reaching ceiling 80 immediately above transparent screen 20 is in focus. Thus, if no polarizing plate 30 is used as in a conventional image display system, an unwanted image is generated easily on ceiling 80 near transparent screen 20. Observer 90 finds this unwanted image obtrusive when appreciating the image on transparent screen 20.

Figure 2:
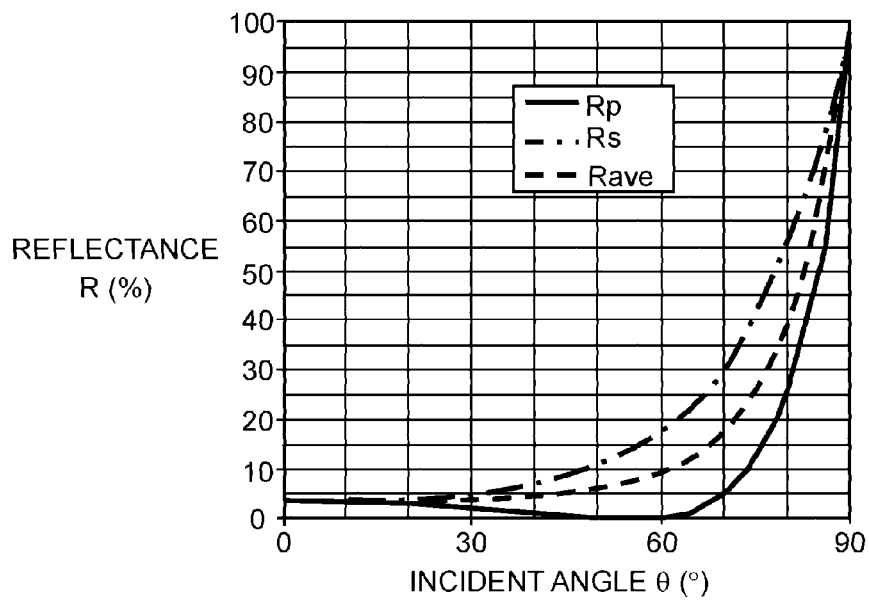
FIG. 2 describes a relationship between an incident angle and a reflectance of projected light in a transparent screen.

FIG. 2 describes the relationship between an incident angle and a reflectance of projected light in the transparent screen. More specifically, FIG. 2 illustrates reflectance R of light entering base 21 (with a refractive index of 1.5) of transparent screen 20 at incident angle θ from the air (with a refractive index of 1.0).

In FIG. 2, a solid line indicates reflectance Rp for p-polarized light, an alternate long and short dashed line indicates reflectance Rs for s-polarized light, and a dashed line indicates reflectance Rave for unpolarized light equally including a p-polarized component and an s-polarized component.

As illustrated in FIG. 2, reflectance Rs for the s-polarized light increases sharply when incident angle θ reaches 50° or larger, and exceeds 20% when incident angle θ is at 65°. On the other hand, reflectance Rp for p-polarized light takes a minimal value of 0% when incident angle θ is about 56°, which is the Brewster's angle, takes 1.5% or less when incident angle θ ranges from 40° to 65°, and takes 5% or less when incident angle θ ranges from 0° to 70°. Furthermore, reflectance Rp is approximately 10% even when incident angle θ is 75°.

The image display system includes polarizing plate 30 disposed between projector 10 and transparent screen 20, on the optical axis of projector 10. Polarizing plate 30 adjusts the image light that is to enter transparent screen 20 so that the image light is p-polarized. In this manner, the image display system according to Embodiment 1 can reduce the specular reflection by transparent screen 20 and suppress the generation of the unwanted image.

Moreover, incident angles θ1, θ2, and θ3 at which the image light adjusted so as to be p-polarized enters transparent screen 20 are set to an angle ranging from 0° to 70°, making it possible to reduce the reflectance of the image light in the image display system to 5% or less. More preferably, by setting incident angles θ1, θ2, and θ3 to an angle ranging from 40° to 65°, it becomes possible to reduce the reflectance of the image light in the image display system to 1.5% or less.

Additionally, when transparent screen 20 is large, it is difficult to set incident angles θ1, θ2, and θ3 at which the image light enters transparent screen 20 to an angle ranging from 40° to 65° in an entire surface of transparent screen 20. As described above, the light specularly reflected at the positions from the central portion to the lower side of transparent screen 20 does not generate the unwanted image easily. Thus, when transparent screen 20 is large, incident angles θ2 and θ3 with respect to transparent screen 20 are set to an angle ranging from 40° to 65° at positions on a side farther from projector 10, namely, from the central portion to the upper side of transparent screen 20 in FIG. 1.

The image display system according to Embodiment 1 can use polarizing plate 30 to adjust the image light projected by projector 10 so that the image light is p-polarized and set incident angles θ2 and θ3 at the positions from the central portion to the upper side of transparent screen 20 to an angle ranging from 40° to 65°, thereby reducing the reflectance of the image light on the surface of transparent screen 20.

With the configuration described above, the image display system according to Embodiment 1 uses smooth-surfaced transparent screen 20 to display an image and transmit background light as well as suppresses the unwanted image due to specular reflection by transparent screen 20. This enhances an effect of the transparent screen in which an image is presented as if it were displayed in the air.

Figure 3:
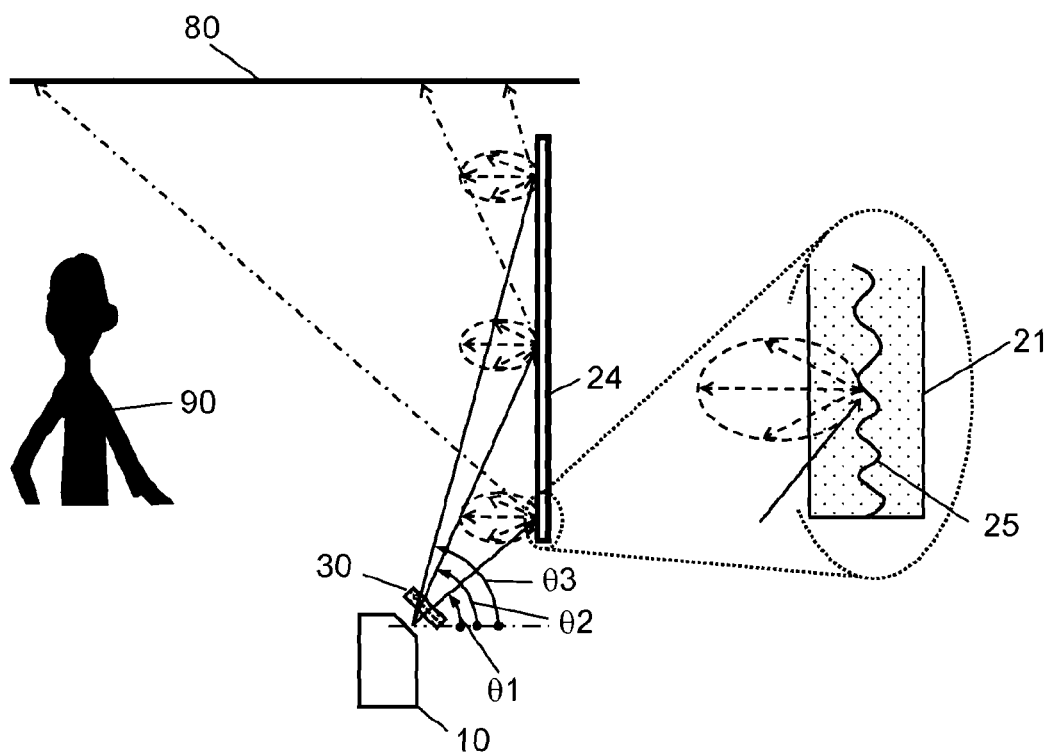
FIG. 3 is a schematic view illustrating an image display system including another transparent screen according to Embodiment 1.

In Embodiment 1, instead of transparent screen 20 obtained by adding diffusing particulates 22 into base 21, the image display system may include transparent screen 24 provided with minutely uneven mirror layer 25 inside base 21 as illustrated in FIG. 3. In this case, mirror layer 25 is designed to be a half mirror that reflects about 10% of incident light and transmits the remaining about 90% of the incident light. Since mirror layer 25 is formed to have minute unevenness, the image light is microscopically turned to diffusely reflected light by transparent screen 24 and thus becomes observable as an image.

Figure 4:
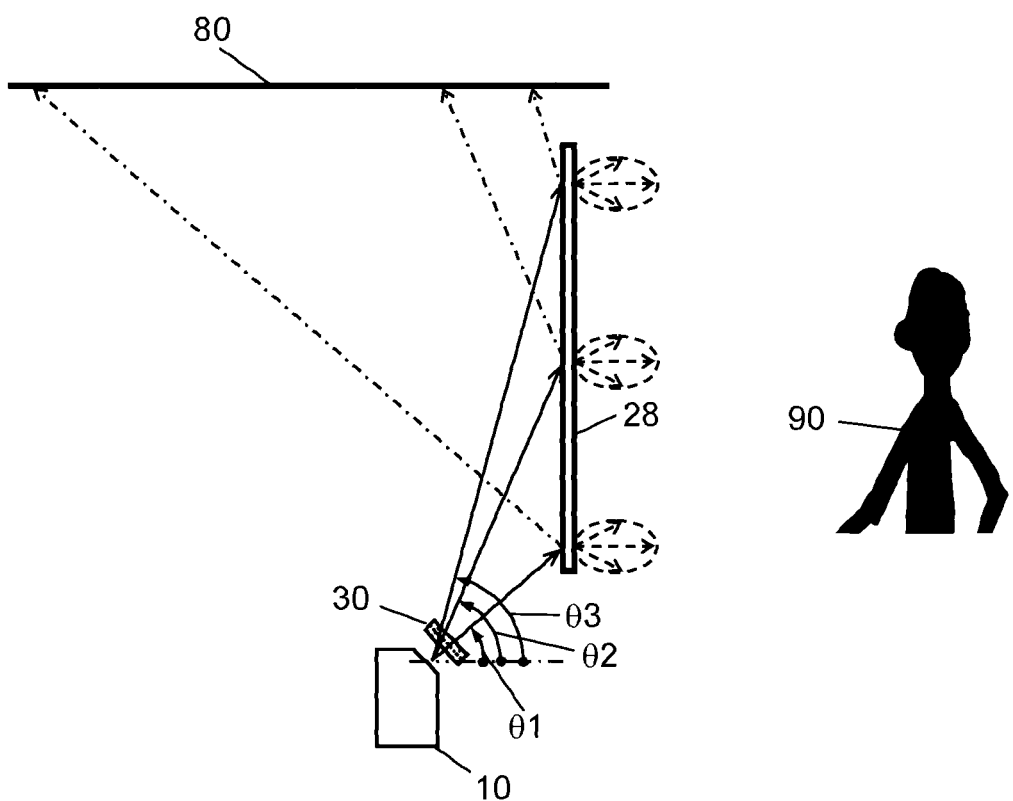
FIG. 4 is a schematic view illustrating an image display system including still other transparent screen according to Embodiment 1.

In Embodiment 1, instead of diffuse-reflection type transparent screen 20, the image display system may include diffuse-transmission type transparent screen 28 as illustrated in FIG. 4. In this case, transparent screen 28 diffusely transmits the image light projected by projector 10, thus displaying an image. In other words, observer 90 observes the diffusely transmitted image. Then, since the surface of transparent screen 28 is smooth in order to achieve transparent screen 28 allowing the background observation, the image light is specularly reflected by the surface of transparent screen 28 similarly to the reflection-type image display system. Even in such a case, by disposing polarizing plate 30 between projector 10 and transparent screen 28 as illustrated in FIG. 4, it is possible to suppress the generation of the unwanted image on ceiling 80.

In Embodiment 1, when projector 10 operates in the liquid crystal system, polarizing plate 30 may be a polarizing plate included in a liquid crystal panel inside projector 10. Also in this case, polarizing plate 30 is disposed such that a polarization direction of the polarized light transmitted by polarizing plate 30 matches with a polarization direction of the p-polarized light reaching the central portion of transparent screen 20. In this way, the image display system can suppress the generation of the unwanted image without increasing the number of components.

Incidentally, when projector 10 operates in the liquid crystal system as described above and a polarization direction of the polarized light transmitted by the polarizing plate included in the liquid crystal panel inside projector 10 does not match with the polarization direction of the p-polarized light reaching the central portion of transparent screen 20, the image display system may include polarizing plate 30 separate from the polarizing plate included in the liquid crystal panel.

Embodiment 2

As described in Embodiment 1, not all of the image light projected by projector 10 is diffusely reflected by transparent screen 20, but part of it is transmitted rectilinearly by transparent screen 20. This is natural for a transparent screen that is provided with a rectilinear transmission property in order to allow the background observation.

For example, when a window on an upper floor of a high-rise building is used as transparent screen 20, this rectilinear transmission component travels rectilinearly toward the sky and thus does not hamper the observation by observer 90.

However, when a window of an indoor shop is used as transparent screen 20, light transmitted by transparent screen 20 sometimes generates an unwanted image on ceiling 80 on a transmitted side similarly to the case where the light specularly reflected by the surface of transparent screen 20 generates the unwanted image on ceiling 80 on a projection side. The projection side refers to a side of projector 10 with respect to transparent screen 20. The transmitted side refers to a side opposite projector 10 with respect to transparent screen 20. The description in Embodiment 2 will be directed to an image display system that suppresses the generation of an unwanted image on ceiling 80 on the transmitted side.

Figure 5:
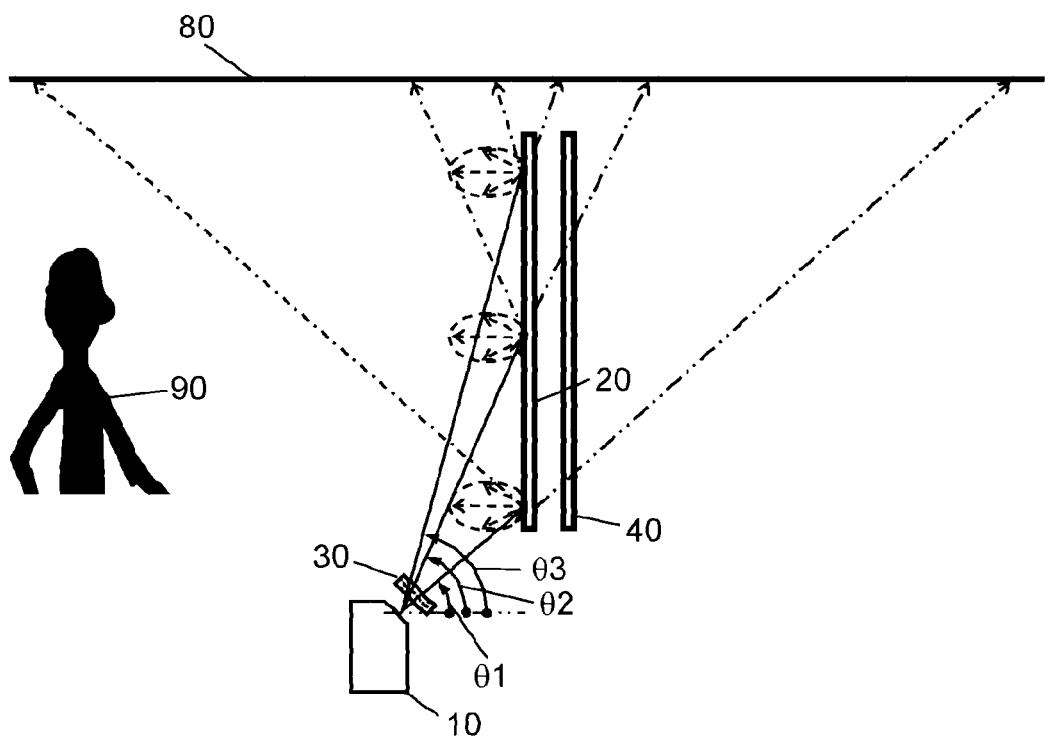
FIG. 5 is a schematic view illustrating an image display system according to Embodiment 2.

FIG. 5 is a schematic view illustrating an image display system according to Embodiment 2.

In addition to the configuration of the image display system in Embodiment 1, the image display system in Embodiment 2 includes polarizing film 40 that is located opposite projector 10 with respect to transparent screen 20.

Polarizing film 40 has a shape equivalent to transparent screen 20 and is disposed substantially in parallel with transparent screen 20 on the transmitted side of transparent screen 20. Here, the equivalent shape may include a shape whose outline and area are the same as those of transparent screen 20 and a shape allowing absorption of all the light transmitted by transparent screen 20.

Polarizing film 40 absorbs a p-polarized component of the image light provided by the adjustment using polarizing plate 30. In other words, polarizing film 40 is disposed such that a polarization direction of the polarized light absorbed by polarizing film 40 matches with a polarization direction of the p-polarized light reaching a central portion of transparent screen 20. In this manner, the light transmitted by transparent screen 20 (indicated by a chain double-dashed line) is adjusted so as to be p-polarized, and thus absorbed by polarizing film 40. Consequently, the image display system according to Embodiment 2 can suppress the generation of the unwanted image on ceiling 80 on the transmitted side of transparent screen 20.

Furthermore, polarizing film 40 absorbs a p-polarized component of light that has entered transparent screen 20 and transmits an s-polarized component thereof. Accordingly, in the image display system according to Embodiment 2, the p-polarized component of the background light is absorbed, so that the brightness of the background light is reduced approximately in half. On the other hand, the s-polarized component of the background light that has been transmitted by polarizing film 40 is transmitted by transparent screen 20, so that observer 90 can observe the background.

With the configuration described above, although the brightness of the background light when observing the background is reduced approximately in half, the image display system according to Embodiment 2 uses the smooth-surfaced transparent screen to display the image and transmit the background light as well as suppresses the unwanted image due to transmission of the transparent screen. This enhances an effect of the transparent screen in which an image is presented as if it were displayed in the air.

(Variation)

Although the polarization adjuster has been the polarizing plate in the image display systems according to Embodiment 1 and Embodiment 2, the polarization adjuster is not necessarily limited to the polarizing plate. For example, if projector 10 operates in the liquid crystal system, the polarization adjuster may be a half-wave plate. The half-wave plate rotates a polarization direction of polarized light that has entered the half-wave plate, and allows the polarized light to leave the half-wave plate. The half-wave plate is disposed such that the polarization direction of the polarized light that has left the half-wave plate matches with a polarization direction of the p-polarized light reaching the central portion of transparent screen 20. In other words, the half-wave plate serving as the polarization adjuster adjusts the image light that is to enter transparent screen 20 so that the image light is p-polarized. In this manner, the image display system in Variation can adjust the image light so that the image light is p-polarized without substantially impairing the brightness of the image light and suppress the generation of the unwanted image due to the specular reflection of transparent screen 20.

The image display system disclosed herein can suppress the generation of the unwanted image due to the specular reflection or transmission by the transparent screen while achieving the transmission of the background light. The image display system disclosed herein is useful as an image display system that reflects or transmits image light from the projector to display an image on the transparent screen while achieving the transmission of the background light.

What is claimed is:

1. An image display system comprising:
   a projector that projects image light;
   a transparent screen that diffuses the image light that has been projected, to display an image; and
   a polarization adjuster that adjusts the image light that is to enter the transparent screen so that the image light is p-polarized,
   wherein the transparent screen includes an uneven mirror layer inside thereof,
   wherein both a front surface and a back surface of the transparent screen are smooth, and
   wherein the image light enters the transparent screen at an incident angle ranging from 40° to 65°.

2. The image display system according to claim 1, wherein the polarization adjuster is disposed between the projector and the transparent screen, on an optical axis of the projector.

3. The image display system according to claim 1, wherein the polarization adjuster is a polarizing plate.

4. The image display system according to claim 1, wherein the polarization adjuster is a half-wave plate.

5. The image display system according to claim 1, wherein the transparent screen diffusely reflects the image light to display the image.

6. The image display system according to claim 5, comprising
   a polarizing film that absorbs a p-polarized component of the image light adjusted by the polarization adjuster, the polarizing film being located opposite the projector with respect to the transparent screen.

7. The image display system according to claim 1, wherein the transparent screen diffusely transmits the image light to display the image.

\* \* \* \* \*